May 12, 1925.                                                          1,537,725
S. S. ZOTTOLI
IMITATION TRAVERTIN AND METHOD OF MAKING SAME
Filed Nov. 28, 1924
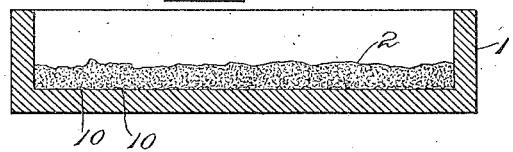
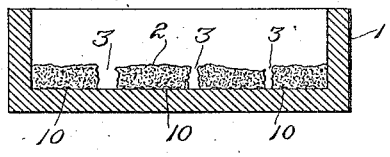
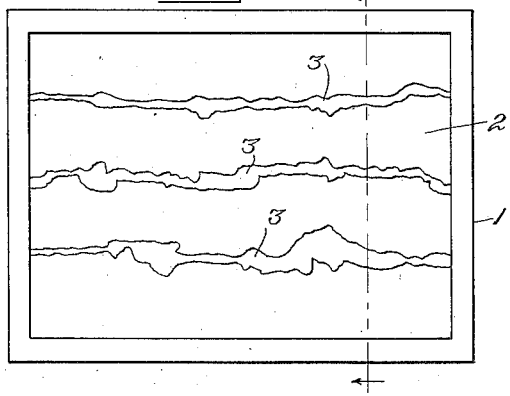
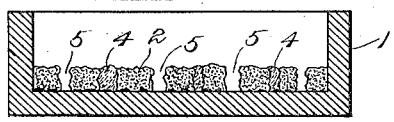
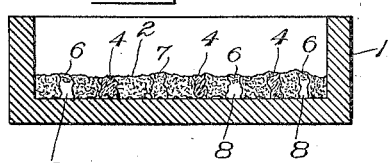
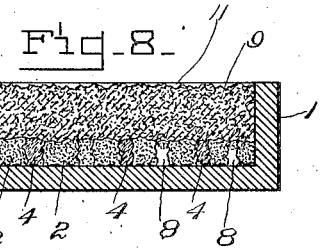
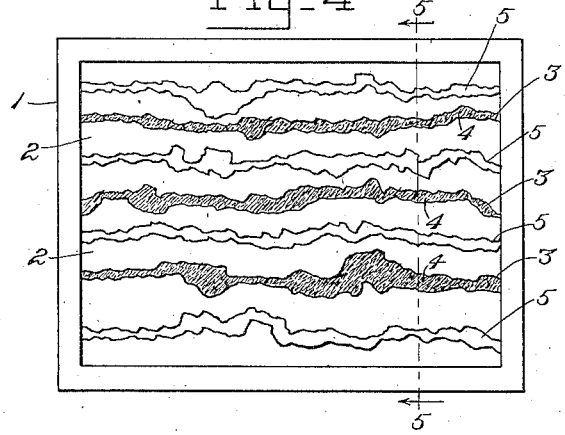
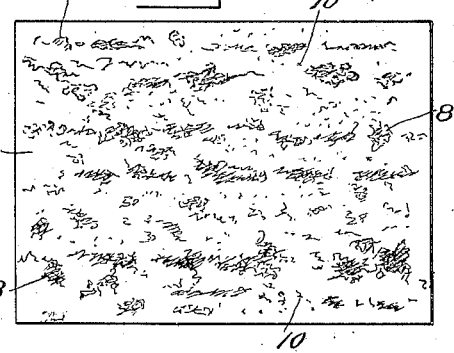
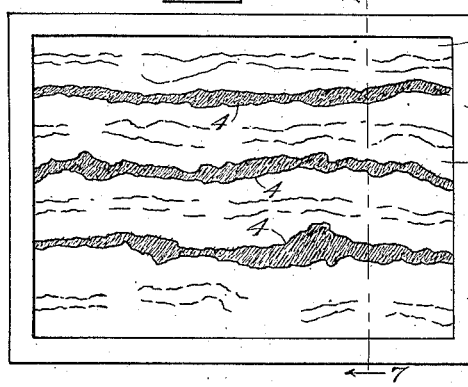
INVENTOR:
Salvatore S. Zottoli
By Macleod, Calver, Copeland & Dike
ATTORNEYS Patented May 12, 1925.

1,537,725

UNITED STATES PATENT OFFICE.

SALVATORE S. ZOTTOLI, OF QUINCY, MASSACHUSETTS.

IMITATION TRAVERTIN AND METHOD OF MAKING SAME.

Application filed November 28, 1924. Serial No. 752,743.

*To all whom it may concern:*

Be it known that I, SALVATORE S. ZOTTOLI, a citizen of the United States, residing at Quincy, county of Norfolk, State of Massachusetts, have invented a certain new and useful Improvement in Imitation Travertin and Methods of Making Same, of which the following is a specification, reference being had therein to the accompanying drawings.

Travertin is a porous marble which is in favor for certain purposes on account of its porous character and the pocks in its surface even when dressed. It is very desirable for use as a facing for walls of terra cotta, brick, concrete, or any other sort of wall in building construction.

One object of the invention is to produce an imitation travertin which will be much cheaper than the natural travertin and which can be formed in molds to the desired shape and thickness.

Another object is to make an imitation travertin which shall be much lighter in weight than the natural travertin.

Another feature of the invention is to make the imitation travertin with a semi-rough backing which shall cause it to adhere better to the wall on which it is used as a facing.

Another object is to construct it in such manner that it shall be both tougher than the natural travertin, that is, less brittle, and which can be nailed to the wall or to the support without so much danger of chipping or breaking the imitation travertin as is the case with the natural travertin.

The invention will be fully understood from the following description when taken in connection with the accompanying drawings and the novel features thereof will be pointed out and clearly defined in the claims at the close of this specification.

In the drawings:

Fig. 1 is a sectional view of a mold having a thin layer of cement in plastic state showing the first step in the formation of the imitation travertin.

Fig. 2 is a plan view of Fig. 1 showing in addition thereto the plastic mass as it appears at the second stage of the process as will be described hereinafter.

Fig. 3 is a section on line 3—3, Fig. 2.

Fig. 4 is a plan view similar to Fig. 2 but at another stage of the process, after the channels shown in Figs. 2 and 3, have been filled and the second set of channels made alternating with those shown in Fig. 2.

Fig. 5 is a section on line 5—5 of Fig. 4.

Fig. 6 is a plan view similar to Fig. 4 showing the appearance after the surface has been trowelled over to form a film over the tops of the second set of channels and partially fill them.

Fig. 7 is a section on line 7—7, Fig. 6.

Fig. 8 is a sectional view showing the layer of cement and woody fibre in the mold on top of the layer shown in Fig. 7.

Fig. 9 is a plan view of a slab of the finished imitation travertin in its completed form.

Referring to the drawings:

There is shown at 1 a mold which may be of rectangular or any other form, shape or size according to the contour and size of the block or slab which is to be molded. In making the imitation travertin there is deposited in the mold a layer 2 of cement in a plastic state which is preferably formed by mixing Keen's cement or similar cement and water to a plastic consistency, about the consistency of stiff bread dough. Preferably this layer should be about ¼ of an inch in depth, although it may be more or less as desired according to the thickness of the facing desired and the use to which the slab is to be put. The under surface of this bottom layer will ultimately be the upper face of the slab when the entire slab is completed and removed from the mold as the slab is built up with the face side down.

While this face layer is in a plastic state there should be formed in it a series of breaks or channels 3 of somewhat irregular shape. As shown in the drawings these breaks are in the form of jagged channels preferably running lengthwise of the mold if the slab is to be of greater length than width. They are irregular in form both as to width and direction of course as they are intended to imitate the irregularities in natural travertin. The channels should preferably extend entirely through the layer, as shown in Fig. 3. They may be readily formed by means of a stick or other suitable tool. The channels are preferably spaced apart about two inches.

After these channels are formed the surface is preferably trowelled over, then the channels are filled with a much thinner mixture of cement 4 than the plastic mass composing the bottom layer. This thinner mixture is in substantially liquid form, sufficiently thin so that it can be poured into the channels. This thin mixture when dried or hardened will have a much smoother surface than the plastic mass of the first layer and of a slightly different color and these smoother portions imitate the smooth strata in the genuine travertin marble.

While the first layer is still in a plastic state another series of breaks or channels 5 along irregular lines are made alternating with the first set of channels 3. This second set of channels extend through to the bottom of the layer 2. No filling material is poured into them but the entire upper surface of the layer 2 is lightly trowelled over or spread in any suitable manner thus making a film of the mixed plastic cement and thinner cement which bridges over the tops of the channels 5 as shown at 6 in Figs. 6 and 7, and fills some portions of the channels 5 to the full depth as shown at 7 so that on the under side there will appear a plurality of rows of pockets instead of a series of continuous channels. The partially filled portions will show as pockets 8 in the face after the entire slab is completed and removed from the mold and turned bottom side up, the side which was the bottom when in the mold then being the face side of the slab. It is obvious that if desired both sets of channels may be made before the thin filling 4 is introduced into one set of channels but in such case greater care is required in pouring in the thin cement so as not to fill the other channels. It is therefore preferable to make the second set of channels after the first set are filled and trowelled over.

There is preferably provided a backing 9 consisting of a mixture of woody fibre and cement which is mixed to a plastic consistency and deposited in the mold on top of the layer 2, as shown in Fig. 8. This layer is preferably of greater depth than the bottom or facing layer 2. Preferably if the layer 2 is ¼ of an inch thick, the second layer is about ⅝ of an inch thick making the total thickness of the material about ⅞ of an inch but the relative thickness of the two layers as well as the combined thickness will vary according to desire.

This backing mixture consists of small pieces of wood or woody material combined with cement, preferably the same kind of cement as used in making the bottom layer, thoroughly mixed into a plastic mass and then put into the mold, forming a layer of the requisite thickness as shown in Fig. 8. This last layer should be put into the mold while the first layer 2 of plastic cement as well as the liquid filling for the first set of channels is still in a moist state as thereby the layer of cement and woody fibre will become more firmly bonded with the lower layer when the mass dries. This mixture of woody fibre and cement is very much lighter in weight than the cement alone would be.

The whole mass is allowed to dry and then removed from the mold. It will be found that all of the layers will be thoroughly bonded together as one solid mass. When turned bottom side up it will appear as shown in Fig. 9. The face may then be finished off by scouring or otherwise to give a more or less smooth finish as desired but the pockets formed by the partially filled channels will still appear in the face side. There will be smaller pockets 10 formed by the breaking of air bubbles formed in the under side while in the mold. In the face of the finished slab the portions formed by the thin mixture poured into the channels will be of a smoother texture than that formed by the plastic mixture and will also be of a somewhat different shade of color, similar to the differences in texture and color in the genuine travertin. If it is to be nailed to studs, boards or other supports, the nails should be inserted in the pockets or grooves and driven through the backing layer of cement and woody fibre into the backing support to which it is to be nailed.

The backing of cement and fibre will have a rough outer surface 11 which will enable it to adhere better to the plastered wall, terra cotta, brick, concrete or other sort of wall than if the backing were of all cement.

What I claim is:

1. The method of making imitation travertin consisting of forming a plurality of cavities in a layer of plastic cement, filling said cavities with cement in a more fluid state than the body of said layer, forming other cavities in said layer while it is still plastic, spreading over the surface to form a bridge of cement over the tops of said last set of cavities and to partially fill them in places, and then allowing the whole mass to dry hard.

2. The method of making imitation travertin which consists in forming in a layer of plastic cement a plurality of open spaces which extend through said layer from the upper to the under side, filling some of said openings with cement in a more fluid state than that composing said layer, forming other openings in said layer, then lightly spreading the surface material and thereby partially filling said second set of openings to form pockets in the opposite face, then allowing the whole mass to dry hard.

3. The method of making imitation travertin which consists in forming in a layer of plastic cement a plurality of openings which extend through said layer from the upper to the under side, filling some of said openings with cement in a more fluid state than that composing said layer, forming other openings in said layer, then lightly spreading the surface material and thereby partially filling said second set of openings to form pockets in the under face, then while the cement of said layer is still moist superposing on the upper face a layer of plastic cement mixed with wood fibre and allowing the whole mass to dry hard.

4. The method of making imitation travertin consisting of depositing a layer of cement in plastic form in a mold, forming in said layer a plurality of openings of irregular form extending through the entire thickness of the layer, filling some of said openings with cement in a more fluid state than that of which said first layer is formed, forming other openings, then spreading over the face of said layer in a manner to bridge over the entrance to said other openings and to fill them in places.

5. The method of making imitation travertin consisting of depositing a layer of cement in plastic form in a mold, forming in said layer a plurality of openings of irregular form extending through the entire thickness of the layer, filling some of said openings with cement in a more fluid state than that of which said first layer is formed, forming other openings, then spreading the face of said layer in a manner to bridge over the entrance to said other opening and fill them in places, leaving pockets in the under face, then while the cement of said layer is still moist, superposing thereon a layer of plastic cement mixed with wood fibre and allowing the whole mass to dry hard.

6. An imitation travertin consisting of a facing layer of cement having cavities filled with cement of a smoother texture than the body of said layer, and having other cavities which are left open on the face side.

7. An imitation travertin consisting of a facing layer of cement having cavities filled with cement of a smoother texture than the body of said layer, and having other cavities partially filled to form pockets on the face side, and a layer of mixed cement and wood fibre on the back side of said facing layer, said two layers being self-bonded together by the cement which composes the two layers.

In testimony whereof I affix my signature.

SALVATORE S. ZOTTOLI.